(12) United States Patent
Takahata

(10) Patent No.: US 9,431,683 B2
(45) Date of Patent: Aug. 30, 2016

(54) HERMETICALLY SEALED LITHIUM SECONDARY BATTERY

(71) Applicant: TOYOTA JIDOSHA KABUSHIKI KAISHA, Toyota-shi, Aichi (JP)

(72) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/348,910

(22) PCT Filed: Oct. 2, 2012

(86) PCT No.: PCT/JP2012/075567
§ 371 (c)(1),
(2) Date: Apr. 1, 2014

(87) PCT Pub. No.: WO2013/051584
PCT Pub. Date: Apr. 11, 2013

(65) Prior Publication Data
US 2014/0242430 A1    Aug. 28, 2014

(30) Foreign Application Priority Data

Oct. 6, 2011    (JP) .................................. 2011-222340

(51) Int. Cl.
| | |
|---|---|
| *H01M 10/42* | (2006.01) |
| *H01M 10/052* | (2010.01) |
| *H01M 2/34* | (2006.01) |
| *H01M 10/0567* | (2010.01) |
| *H01M 4/70* | (2006.01) |

(52) U.S. Cl.
CPC ......... *H01M 10/4235* (2013.01); *H01M 2/345* (2013.01); *H01M 10/0567* (2013.01); *H01M 4/70* (2013.01); *H01M 10/052* (2013.01); *H01M 2200/20* (2013.01); *H01M 2220/20* (2013.01); *H01M 2300/0025* (2013.01); *Y02E 60/122* (2013.01); *Y02T 10/7011* (2013.01)

(58) Field of Classification Search
CPC ......... H01M 10/052; H01M 10/0567; H01M 10/4235; H01M 2200/20; H01M 2220/20; H01M 2300/0025; H01M 2/345; H01M 4/70
See application file for complete search history.

(56) References Cited

U.S. PATENT DOCUMENTS

| | | | |
|---|---|---|---|
| 6,261,722 B1 * | 7/2001 | Dasgupta et al. | 429/304 |
| 6,335,114 B1 * | 1/2002 | Ueshima et al. | 429/94 |
| 2008/0008928 A1 * | 1/2008 | Partin et al. | 429/61 |

(Continued)

FOREIGN PATENT DOCUMENTS

| | | |
|---|---|---|
| CN | 101479865 | 7/2009 |
| JP | 2005-332650 | 12/2005 |
| JP | 2008-243659 | 10/2008 |

(Continued)

*Primary Examiner* — Carlos Barcena
(74) *Attorney, Agent, or Firm* — Finnegan, Henderson, Farabow, Garrett & Dunner, LLP

(57) ABSTRACT

A hermetically sealed lithium secondary battery is provided which has an excellent battery performance and in which a current-interrupt mechanism operates accurately when overcharging occurs. This battery comprising an electrode assembly 80 that has a positive electrode 10. The positive electrode 10 has a positive electrode current collector 12, a positive electrode mixture layer 14 formed on the current collector, and a positive electrode assist layer 16 formed on the current collector and adjacent to the positive electrode mixture layer 14.

7 Claims, 5 Drawing Sheets

(56) References Cited

U.S. PATENT DOCUMENTS

2011/0200884 A1* 8/2011 Uchida .................. 429/245
2014/0023919 A1* 1/2014 Minami et al. ............ 429/209

FOREIGN PATENT DOCUMENTS

| | | |
|---|---|---|
| JP | 2008-277106 | 11/2008 |
| JP | 2010-171020 | 8/2010 |

* cited by examiner

HERMETICALLY SEALED LITHIUM SECONDARY BATTERY

CROSS-REFERENCE TO RELATED APPLICATIONS

This application is a national phase application of International Application No. PCT/JP2012/075567, filed Oct. 2, 2012, and claims the priority of Japanese Application No. 2011-222340, filed Oct. 6, 2011, the content of both of which is incorporated herein by reference.

TECHNICAL FIELD

The present invention relates to a lithium secondary battery that has a hermetically sealed structure. More particularly, the present invention relates to a hermetically sealed secondary battery that is provided with a current-interrupt mechanism that is operated by an increase in the pressure within the battery.

BACKGROUND ART

Lithium ion batteries and other lithium secondary batteries have become increasingly important in recent years as vehicular power sources and as power sources for personal computers and mobile and portable electronic devices. In particular, lithium secondary batteries, because they provide a high energy density at a low weight, are preferentially used as high-output power sources for installation in vehicles. One implementation of this battery is the hermetically sealed lithium secondary battery. This battery is typically fabricated by introducing an electrode assembly—itself having positive and negative electrodes that are provided with active materials—into a battery case together with an electrolyte (typically an electrolyte solution) and then sealing the opening (hermetically sealing).

Hermetically sealed lithium secondary batteries are generally used in a controlled state that keeps the voltage in a prescribed range (for example, 3.0 V to 4.2 V); however, they may become overcharged when the prescribed voltage is exceeded when a greater than normal current is supplied due to, for example, malfunctions. When overcharging occurs, gas may be generated due to decomposition of the electrolyte and/or the temperature within the battery may rise due to heat generation by the active material. A current-interrupt mechanism—which interrupts the charging current through the operation of a current-interrupt valve when the pressure within the battery case meets or exceeds a prescribed value due to, for example, gas generation—is therefore widely used in order to deal with this overcharging.

A known technique when such a current-interrupt mechanism is employed is the preliminary incorporation in the electrolyte of a compound that has a lower oxidation potential (i.e., the voltage at which oxidative decomposition begins) than the nonaqueous solvent of the electrolyte (such a compound is also referred to herebelow as an "overcharge inhibitor"). When the battery enters an overcharged state, the overcharge inhibitor undergoes oxidative decomposition—prior to the occurrence of electrolyte decomposition—and a large amount of gas is generated as a result. This gas causes the internal pressure in the battery to undergo a rapid rise and can thus induce an earlier (i.e., the battery is in a safer state) operation of the current-interrupt mechanism. Aromatic compounds, e.g., cyclohexylbenzene (CHB) and so forth, are a typical example of this type of overcharge inhibitor.

In order to induce an even quicker operation of this mechanism, a technique has recently been proposed in which the amount of gas generation is increased through the addition of an inorganic compound to the positive electrode mixture layer. Patent Literature 1 and Patent Literature 2 are examples of this type of conventional art. Patent Literature 1 states that the reaction efficiency of the overcharge inhibitor can be raised by the addition to the positive electrode mixture layer of a phosphate salt (a compound that contains the phosphate ion) acting as a reaction catalyst. Patent Literature 2 states that, when a carbonate salt (specifically lithium carbonate) is incorporated in the positive electrode mixture layer, this carbonate salt undergoes decomposition when overcharging occurs and a large amount of carbon dioxide gas can be generated as a result.

CITATION LIST

Patent Literature

Patent Literature 1: JP 2008-243659 A
Patent Literature 2: JP 2010-171020 A

When overcharging occurs, the overcharge inhibitor referenced above in contact with the surface of the positive electrode (typically the surface of the positive electrode active material and the surface of the electroconductive material) undergoes oxidative decomposition with the production of the hydrogen ion ($H^+$). Electron donation to this hydrogen ion at the negative electrode also results in the production of hydrogen gas. As a consequence, the amount of gas production originating from the oxidative decomposition reaction of the overcharge inhibitor depends on the amount of overcharge inhibitor present in the vicinity of the positive electrode and/or on the area of contact (the reaction field) between the positive electrode and the overcharge inhibitor.

Accordingly, methods that can be contemplated for increasing the amount of gas generation include, for example, increasing the amount of addition of the overcharge inhibitor and broadening the area of contact with the overcharge inhibitor by increasing the amount of addition of the electroconductive material in the positive electrode mixture layer. However, the overcharge inhibitor functions as a resistance component for the battery reactions, and raising its amount of addition thus risks lowering the battery performance (for example, increasing the internal resistance, lowering the durability, and so forth) and hence is disfavored. In addition, raising the amount of electroconductive material in the positive electrode mixture layer risks lowering the density of the positive electrode mixture layer and also risks causing a decline in the capacity per unit volume. It is quite difficult for the art described in the existing Patent Literature 1 and Patent Literature 2 to respond to these problems. The present invention was pursued considering these points and takes as its object the introduction of a hermetically sealed lithium secondary battery that has a current-interrupt mechanism that is operated by a rise in the pressure within the battery case, wherein this hermetically sealed lithium secondary battery exhibits an excellent battery performance and its current-interrupt mechanism is capable of a rapid and accurate operation when overcharging occurs.

In order to realize this object, a hermetically sealed lithium secondary battery is provided that has an electrode assembly having a positive electrode and a negative electrode, a battery case that houses this electrode assembly and an electrolyte, and a current-interrupt mechanism that operates when the internal pressure for the battery case has risen. The positive electrode is provided with a positive electrode current collector and a positive electrode mixture layer formed on this current collector and containing a positive electrode active material, an electroconductive material, and a binder. In addition, a positive electrode assist layer that contains an electroconductive material and a binder and that substantially does not contain a positive electrode active material, is formed on the positive electrode current collector in at least a portion of an area adjacent to the positive electrode mixture layer. The negative electrode is provided with a negative electrode current collector and a negative electrode mixture layer formed on this current collector and containing a negative electrode active material and a binder. The electrolyte also incorporates an overcharge inhibitor that generates a gas when a prescribed battery voltage is exceeded.

In the herein disclosed hermetically sealed lithium secondary battery, the overcharge inhibitor can produce a decomposition reaction not only at the surface of the (usual) positive electrode mixture layer, but also at the surface of the positive electrode assist layer. Accordingly, an even broader reaction field for the overcharge inhibitor can be secured. As a consequence, a large amount of gas can be rapidly generated when overcharging occurs, but without an excessive amount of addition of the overcharge inhibitor and without an excessive amount of electroconductive material in the positive electrode mixture layer the compositional proportion for the electroconductive material in the positive electrode mixture layer). This art uses a method that is substantially different from the conventional art to improve the operating performance of the current-interrupt mechanism and raise the tolerance of the hermetically sealed lithium secondary battery at the time of overcharging.

For example, lowering the set value for the pressure that operates the current-interrupt valve can also be contemplated as a technique for bringing about rapid operation of the current-interrupt mechanism. However, this may produce malfunctions due to, inter alia, minor variations in the surrounding environment. Due to this, increasing the amount of gas generation and/or increasing the pressure is critical for preventing malfunctions and for the rapid operation of the current-interrupt mechanism when overcharging occurs. Additional improvements in the reliability and in the tolerance to overcharging have come to be desired in recent years due, with regard to the range of applications for lithium secondary batteries, to the rapid expansion of utilization in fields that require high-capacity power sources, i.e., in vehicular applications and so forth. The herein disclosed art can solve these problems.

In a preferred aspect of the herein disclosed hermetically sealed lithium secondary battery, the density of the positive electrode mixture layer formed on the positive electrode current collector is, for example, at least 2.0 g/cm$^3$ (typically from 2.0 g/cm$^3$ to 4.5 g/cm$^3$ and preferably from 2.5 g/cm$^3$ to 4.5 g/cm$^3$).

The increase in battery capacity in recent years has been accompanied by a trend of increasing density for the positive electrode mixture layer and a trend of diminishing voids within the positive electrode mixture layer. Due in this case to the decline in the amount of overcharge inhibitor present in the vicinity of the positive electrode and/or to the decline in the area of contact between the positive electrode and the overcharge inhibitor, there is a risk that little decomposition gas will be generated when overcharging occurs and/or that the generation of decomposition gas when overcharging occurs be slow. When in particular overcharging occurs during high-current charging, the current-interrupt mechanism may then not function rapidly due to the slow decomposition reaction. However, because, in the herein disclosed battery, the decomposition reaction of the overcharge inhibitor occurs at the positive electrode assist layer, a large amount of gas can be rapidly generated upon overcharging even when the density of the positive electrode mixture layer has been increased. The current-interrupt mechanism can then operate rapidly and accurately as a result.

In another preferred aspect of the herein disclosed hermetically sealed lithium secondary battery, the electrode assembly is a wound electrode assembly provided by stacking and winding a long strip-shaped positive electrode having, on a long strip-shaped positive electrode current collector, a positive electrode mixture layer of prescribed width formed along the longitudinal direction of the current collector, with a long strip-shaped negative electrode having, on a long strip-shaped negative electrode current collector, a negative electrode mixture layer that has a width greater than that of the positive electrode mixture layer and that is formed along the longitudinal direction of the current collector. In addition, the positive electrode assist layer is formed at the long strip-shaped positive electrode along the longitudinal direction on at least one side along the longitudinal direction of the positive electrode mixture layer.

The overcharge inhibitor is generally deficient at the central part of the winding in the usual so-called wound electrode assembly, i.e., diffusion of the overcharge inhibitor becomes rate-limiting, and there is thus a tendency for generation of the decomposition gas to be slow. This tendency is particularly significant during high-current charging. However, in the herein disclosed wound electrode assembly, large amounts of gas can be efficiently generated because the decomposition reaction of the overcharge inhibitor is produced at the edge region, where the overcharge inhibitor can easily permeate (i.e., the positive electrode assist layer disposed in an area to a side of the positive electrode mixture layer). The current interrupt mechanism can then be caused to rapidly and accurately operate as a result.

In a preferred aspect of the hermetically sealed lithium secondary battery having such a wound electrode assembly, in the width direction of the long strip-shaped positive electrode the width in the sum of the positive electrode mixture layer and the positive electrode assist layer is formed so as to exceed the width of the negative electrode mixture layer.

In a typical wound electrode assembly, the width of the positive electrode mixture layer must be made smaller than the width of the opposing negative electrode mixture layer in order to prevent, inter alia, the occurrence of internal short circuits caused by lithium precipitation. However, the herein disclosed positive electrode assist layer, because it substantially does not contain a positive electrode active material, can be fabricated with a broad width without restriction by the width of the negative electrode mixture layer. Due to this, the reaction field for the overcharge inhibitor can be significantly increased and large amounts of gas can then be rapidly generated when overcharging occurs. A more rapid operation of the current-interrupt mechanism can be brought about as a consequence.

An electroconductive material having a specific surface area of at least 100 m$^2$/g (for example, approximately 100 m$^2$/g to 500 m$^2$/g) is preferably used for the electroconductive material present in the herein disclosed positive electrode assist layer.

A positive electrode assist layer provided with this electroconductive material can secure a broad field of reaction with the overcharge inhibitor and can thus favorably improve the efficiency of gas generation during overcharging. The current-interrupt mechanism can then be made to operate rapidly as a result. In this Description, the "specific surface area" refers to the specific surface area (the BET specific surface area) measured by the BET method (for example, the BET single-point method) using nitrogen gas.

The herein disclosed overcharge inhibitor can be a substance that has an oxidation potential (vs. Li/Li$^+$) greater than or equal to the charging upper limit potential for the positive electrode and that is capable of generating a gas by undergoing oxidative decomposition when this potential is exceeded and an overcharged state is reached. For example, a compound with an oxidation potential of 4.4 V to 4.9 V is preferably used with a battery for which the charging upper limit potential (vs. Li/Li$^+$) for the positive electrode has been set to approximately 4.0 V to 4.2 V. Compounds that have this property can be exemplified by biphenyl (BP) and cyclohexylbenzene (CHB).

The herein disclosed art is effective when a battery that has been provided with an increased capacity and an increased density becomes overcharged during high-current charging. In particular, the herein disclosed hermetically sealed lithium secondary battery can as a consequence be favorably used as a motive power source (power source) for the motor drive for a vehicle (typically an automobile and in particular a hybrid automobile, plug-in hybrid automobile, electric automobile, and fuel cell automobile). Thus, the present invention provides a vehicle that is equipped with any of the herein disclosed hermetically sealed lithium secondary batteries (this includes a battery pack configuration in which a plurality of the batteries are connected).

DESCRIPTION OF EMBODIMENTS

Figure 1:
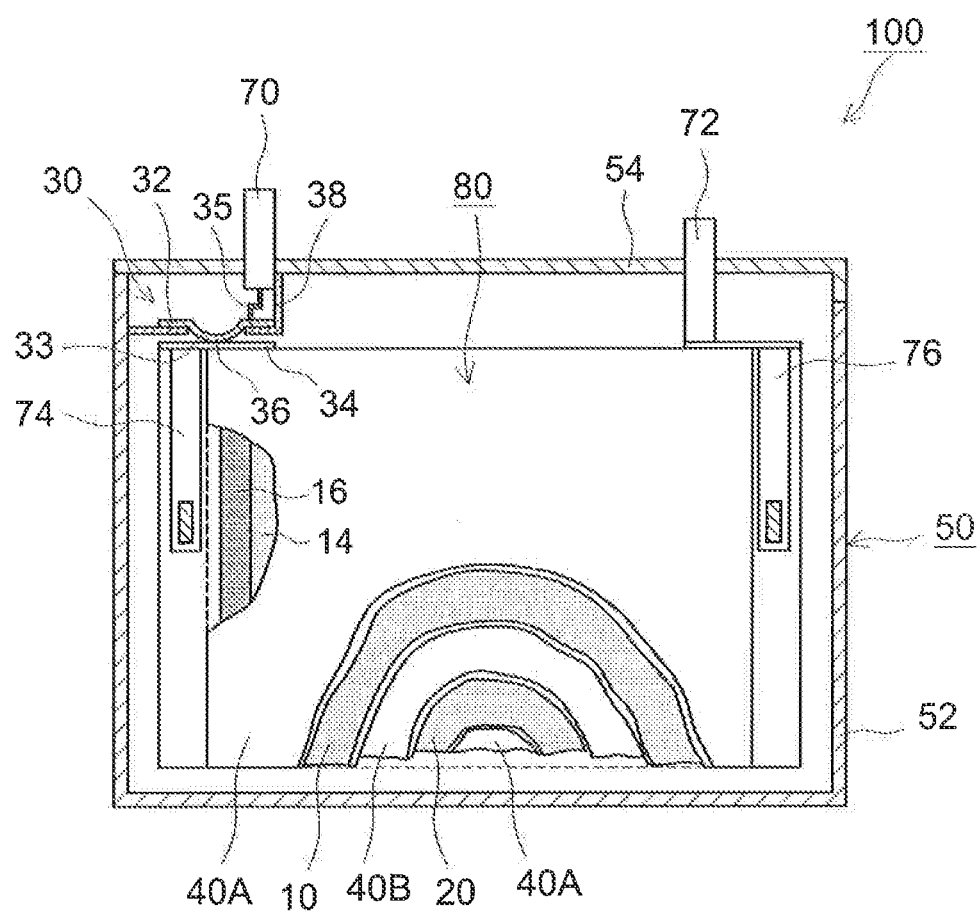
FIG. 1 is a cross-sectional diagram that schematically shows the structure of a hermetically sealed lithium secondary battery according to an embodiment of the present invention.

Preferred embodiments of the herein disclosed hermetically sealed lithium secondary battery are described in the following. Matters required for implementation but not particularly described in this Description can be understood as design matters for the individual skilled in the art based on the conventional art in the pertinent field. The lithium secondary battery with the present structure can be implemented based on the contents disclosed in this Description and the common general technical knowledge in the pertinent field.

The herein disclosed hermetically sealed lithium secondary battery is provided with an electrode assembly having a positive electrode and a negative electrode, a battery case that houses the electrode assembly and an electrolyte, and a current-interrupt mechanism that operates when the pressure within the battery case has risen. The positive electrode is provided with a positive electrode active material-containing positive electrode mixture layer on a positive electrode current collector. The positive electrode is also provided, in at least a region adjacent to the positive electrode mixture layer, with a positive electrode assist layer that contains an electroconductive material and a binder and that substantially does not contain a positive electrode active material. The negative electrode is provided with a negative electrode active material-containing negative electrode mixture layer on a negative electrode current collector. The electrolyte contains an overcharge inhibitor that generates a gas when a prescribed battery voltage is exceeded. Thus, insofar as the object of the present invention can be realized, there are no particular limitations on the nature for example, the material and composition) of the other constituent battery materials, members, and so forth, and those that are the same as in conventional lithium secondary batteries can be used.

In this Description, "lithium secondary battery" refers to a secondary battery that utilizes the lithium ion as a supporting salt and that realizes charging and discharge by the movement of the lithium ion between the positive and negative electrodes. The secondary batteries generally referred to as lithium ion batteries (or lithium ion secondary batteries), lithium polymer batteries, and so forth are typical examples encompassed by the lithium secondary battery in this Description. Also, the "active material" in this Description refers to a material (compound) that participates in the storage of electricity on the positive electrode side or negative electrode side. That is, it is a substance that participates in the release or intake of electrons during battery charge-discharge.

<<The Positive Electrode>>

The positive electrode in the herein disclosed hermetically sealed lithium secondary battery is provided with a positive electrode current collector, a positive electrode mixture layer (also referred to as the positive electrode active material layer) formed on this positive electrode current collector, and a positive electrode assist layer in at least a portion of an area adjacent to the positive electrode mixture layer.

In the fabrication of this positive electrode, the positive electrode mixture layer is formed by preparing a composition in slurry form (here and below, this also encompasses pastes and inks) in which the positive electrode active material is dispersed in a suitable medium along with the electroconductive material, binder, and so forth (this composition is referred to in the following as the "positive electrode mixture slurry") and by applying and drying this positive electrode mixture slurry on one side or both sides of the positive electrode current collector. The positive electrode assist layer is then formed by preparing a slurry-form composition in which the electroconductive material and binder are dispersed in a suitable solvent (this composition is referred to below as the "positive electrode assist slurry") and by applying and drying this positive electrode assist slurry on at least a portion of an area adjacent to the positive electrode mixture layer. An aqueous solvent or an organic solvent can be used as the solvent; for example, N-methyl-2-pyrrolidone (NMP) can be used.

An electroconductive member of a metal having a good electroconductivity (for example, aluminum, nickel, titanium, stainless steel, and so forth) is preferably used for the positive electrode current collector. The shape of the current collector is not particularly limited since it can vary in conformity with, for example, the shape of the battery being fabricated; however, for example, a rod-shaped article, plate-shaped article, foil, mesh, and so forth, can be used. A foil is mainly used in batteries provided with the wound electrode assembly described below. The thickness of the current collector foil is not particularly limited, but in order to obtain a good balance between the capacity density of the battery and the strength of the current collector, an approximately 5 μm to 200 μm (typically 5 μm to 50 μm and preferably 8 μm to 30 μm) current collector foil is preferably used.

<The Positive Electrode Mixture Layer>

The positive electrode mixture layer contains a positive electrode active material, an electroconductive material, and a binder. One or two or more of the various materials known to be usable as a positive electrode active material in a lithium secondary battery can be used without particular limitation as the positive electrode active material. For example, an oxide having a layered structure or a spinel structure and containing lithium and a transition metal element as structural metal elements (a lithium transition metal oxide), e.g., lithium nickel oxide (for example, $LiNiO_2$), lithium cobalt oxide (for example, $LiCoO_2$), and lithium manganese oxide (for example, $LiMn_2O_4$), can be used. Preferred for use thereamong are positive electrode active materials in which the main component is a lithium nickel cobalt manganese complex oxide (for example, $LiNi_{1/3}Co_{1/3}Mn_{1/3}O_2$) (the positive electrode active material is typically constituted substantially of a lithium nickel cobalt manganese complex oxide).

Here, the meaning of lithium nickel cobalt manganese complex oxide, besides referring to oxides in which the structural metal elements are Li, Ni, Co, and Mn, also encompasses oxides that contain at least one metal element other than Li, Ni, Co, and Mn (i.e., a transition metal element and/or a main-group metal element other than Li, Ni, Co, and Mn). This metal element can be exemplified by one or two or more elements from Al, Cr, Fe, V, Mg, Ti, Zr, Nb, Mo, W, Cu, Zn, Ga, In, Sn, La, and Ce. The same also applies to the lithium nickel oxides, lithium cobalt oxides, and lithium manganese oxides. For example, the lithium transition metal oxide powders produced by heretofore known methods can be used as such for the lithium transition metal oxide (typically in particulate form) under consideration. For example, the use is preferred as the positive electrode active material of a lithium transition metal oxide powder that is substantially constituted of secondary particles having an average particle diameter in the range from approximately 0.1 μm to 25 μm (typically 0.1 μm to 20 μm, for example, 0.5 μm to 15 μm and preferably 1 μm to 10 μm).

The positive electrode mixture layer used here may as necessary contain one or two or more of the materials usable as structural components of the positive electrode mixture layer in ordinary lithium secondary batteries. Electroconductive materials and binders are examples of such materials. A material as heretofore used to produce lithium secondary batteries can be used without particular limitation as the electroconductive material. The electroconductive material can specifically be a single selection or two or more selections from carbonaceous materials such as carbon blacks (for example, acetylene black (AB), furnace black, Ketjen black, channel black, lamp black, and thermal black), coke, active carbon, graphite, carbon fibers (PAN-based carbon fibers, pitch-based carbon fibers), carbon nanotubes, and so forth.

A material as heretofore used to produce lithium secondary batteries can be used without particular limitation as the binder. For example, various polymers can favorably be used. A polymer that dissolves or disperses in water is preferably used when the positive electrode mixture layer is formed using an aqueous slurry. Such a polymer can be exemplified by cellulosic polymers, fluororesins, vinyl acetate copolymers, rubbers, and so forth. This polymer can be more specifically exemplified by carboxymethyl cellulose (CMC, typically as the sodium salt), hydroxypropylmethyl cellulose (HPMC), polyvinyl alcohol (PVA), polytetrafluoroethylene (PTFE), tetrafluoroethylene-hexafluoropropylene copolymer (FEP), styrene-butadiene rubber (SBR), and acrylic acid-modified SBR resins (SBR latexes). Or, a polymer that disperses or dissolves in organic solvent is preferably used when the positive electrode mixture layer is formed using a nonaqueous slurry, i.e., a solvent-based slurry in which the main component of the dispersion medium is an organic solvent. Such a polymer can be exemplified by polyvinylidene fluoride (PVdF), polyvinylidene chloride (PVdC), and polyethylene oxide (PEO). In addition, an inorganic compound (e.g., a phosphate salt or carbonate salt) that can generate gas when overcharging occurs may also be incorporated in advance.

The mass of the positive electrode mixture layer disposed per unit area of the positive electrode current collector (the total mass on both sides for a structure that has the positive electrode mixture layer on both sides of the positive electrode current collector) is favorably, for example, approximately 5 $mg/cm^2$ to 40 $mg/cm^2$ (typically approximately 10 $mg/cm^2$ to 20 $mg/cm^2$). The masses of the positive electrode mixture layers disposed on the individual sides of the positive electrode current collector are generally preferably about the same. The proportion of the positive electrode active material in the overall positive electrode mixture layer is favorably at least approximately 50% by mass (typically from 70% by mass to 95% by mass) and generally is preferably approximately 80% by mass to 95% by mass. The proportion of the electroconductive material in the overall positive electrode mixture layer can be, for example, approximately 1% by mass to 20% by mass and is generally favorably approximately 2% by mass to 15% by mass (for example, 3% by mass to 10% by mass). The proportion of the binder in the overall positive electrode mixture layer can be, for example, approximately 0.1% by mass to 20% by mass and is generally favorably approximately 0.5% by mass to 10% by mass (for example, 1% by mass to 5% by mass).

After the positive electrode mixture slurry has been dried, the thickness and density of the positive electrode mixture layer can be adjusted by the execution of a suitable pressing treatment (various heretofore known pressing methods can be used, for example, roll pressing methods, platen pressing methods, and so forth). The density of the positive electrode mixture layer can be, for example, approximately 1.5 $g/cm^3$ to 4.5 $g/cm^3$ (typically approximately 2.0 $g/cm^3$ to 4.0 $g/cm^3$ and preferably approximately 2.0 $g/cm^3$ to 3.5 $g/cm^3$). The void ratio in the positive electrode mixture layer can be, for example, approximately 5% by volume to 40% by volume (typically approximately 10% by volume to 35% by volume and preferably approximately 15% by volume to 30% by volume). A decomposition reaction by the overcharge inhibitor is also produced at the positive electrode assist layer in the herein disclosed battery. Due to this, even when the density of the positive electrode mixture layer has been increased as referenced above, a large amount of gas can still be rapidly generated when overcharging occurs. The current-interrupt mechanism can be rapidly and accurately operated as a result.

<The Positive Electrode Assist Layer>

The positive electrode assist layer is formed from an electroconductive material and a binder and substantially does not contain a positive electrode active material. Here, "substantially does not contain" means that a positive electrode active material is at least not intentionally incorporated and should not be taken to exclude, for example, introduction as an incidental impurity and so forth.

The electroconductive material here can be a single selection or two or more selections without particular limitation from the electroconductive materials provided above as examples for use in the positive electrode mixture layer. Thus, the electroconductive material used here may or may not be the same as the electroconductive material used in the positive electrode mixture layer. Preferred for use thereamong in particular are electroconductive materials that have a specific surface area of at least approximately 100 $m^2/g$ (for example, approximately 100 m g to 500 $m^2/g$). A positive electrode assist layer provided with this electroconductive material can secure a broad reaction field with the overcharge inhibitor and thus makes it possible for a large amount of gas to be rapidly generated when overcharging occurs. The current-interrupt mechanism can then be rapidly operated as a result.

The binder can be a single selection or two or more selections without particular limitation from the binders provided above as examples for use in the positive electrode mixture layer. Thus, the binder used here may or may not be the same as the binder used in the positive electrode mixture layer.

The mass of the positive electrode assist layer disposed per unit area of the positive electrode current collector (the total mass on both sides for a structure that has the positive electrode assist layer on both sides of the positive electrode current collector) can be, for example, approximately 1 $mg/cm^3$ to 20 $mg/cm^2$ (typically approximately 5 $mg/cm^2$ to 10 $mg/cm^2$). The proportion of the electroconductive material in the overall positive electrode assist layer is favorably at least approximately 50% by mass (typically from 70& by mass to 95% by mass) and generally is preferably approximately 80% by mass to 95% by mass. The proportion of the binder in the overall positive electrode assist layer can be, for example, approximately 1% by mass to 30% by mass and is generally favorably approximately 5% by mass to 20% by mass (for example, 5% by mass to 15% by mass).

After the positive electrode assist slurry has been dried, the thickness and density of the positive electrode assist layer can be adjusted by the execution of a suitable pressing treatment (various heretofore known pressing methods can be used, for example, roll pressing methods, platen pressing methods, and so forth). The density of the positive electrode assist layer can be, for example, approximately 0.5 $g/cm^3$ to 2.0 $g/cm^3$ (typically approximately 1.0 $g/cm^3$ to 1.5 $g/cm^3$). The void ratio in the positive electrode assist layer can be, for example, approximately 5% by volume to 40% by volume (typically approximately 10% by volume to 35% by volume and preferably approximately 15% by volume to 30% by volume). By doing this, a suitable decomposition of the overcharge inhibitor can be induced at the positive electrode assist layer and a large amount of gas can then be generated when overcharging occurs. The current-interrupt mechanism can be rapidly and accurately operated as a result. The pressing treatments may be combined into a single pressing treatment carried out after both the positive electrode mixture slurry and the positive electrode assist slurry have been dried.

<<The Negative Electrode>>

The negative electrode in the herein disclosed hermetically sealed lithium secondary battery is provided with a negative electrode current collector and a negative electrode mixture layer (also referred to as a negative electrode active material layer) formed on the negative electrode current collector.

In the fabrication of this negative electrode, a slurry-form composition is first prepared in which the negative electrode active material is dispersed in a suitable solvent along with the binder and so forth (this composition is referred to in the following as the "negative electrode mixture slurry"). The negative electrode mixture layer is formed by applying and drying this negative electrode mixture slurry on one side or both sides of the negative electrode current collector. The solvent used here may be an aqueous solvent or an organic solvent; for example, water can be used.

An electroconductive material of a metal having a good electroconductivity (for example, copper, nickel, titanium, stainless steel, and so forth) is preferably used for the negative electrode current collector. The shape of the negative electrode current collector can be the same as the positive electrode current collector.

<The Negative Electrode Mixture Layer>

The negative electrode mixture layer contains a negative electrode active material and a binder. One or two or more of the various materials known to be usable as a negative electrode active material in lithium secondary batteries can be used without particular limitation as the negative electrode active material. An example is a particulate carbonaceous material (carbon particles) that in at least a portion thereof contains a graphite structure (layered structure). More specifically, various carbonaceous materials can be used, e.g., so-called graphite, graphitization-resistant carbon (hard carbon), graphitization-susceptible carbon (soft carbon), carbon nanotubes, and carbonaceous materials having structures that combine the preceding. For example, the use of natural graphite (black lead) or artificial graphite is preferred. The form of the negative electrode active material is generally preferably particulate with an average particle diameter of approximately 0.5 µm to 20 µm (typically approximately 1 µm to 15 µm, for example, approximately 4 µm to 10 µm).

For the binder, a suitable selection can be made from the polymers provided above as examples of the binder for the positive electrode mixture layer. Examples are polyvinylidene fluoride (PVdF), polytetrafluoroethylene (PTFE), and styrene-butadiene rubber (SBR). Otherwise, various electroconductive materials and polymers (for example, carboxymethyl cellulose (CMC)) that can function as thickeners for the negative electrode mixture layer-forming slurry can also be used as appropriate.

The mass of the negative electrode mixture layer disposed per unit area of the negative electrode current collector (the total mass on both sides for a structure that has the negative electrode mixture layer on both sides of the negative electrode current collector) can be, for example, approximately 5 $mg/cm^2$ to 20 $mg/cm^2$ (typically approximately 5 $mg/cm^2$ to 10 $mg/cm^2$). In the case of a structure that has a negative electrode mixture layer on both sides of the negative electrode current collector, the masses of the negative electrode mixture layers disposed on the individual sides of the negative electrode current collector are generally preferably about the same. The proportion of the negative electrode active material in the overall negative electrode mixture layer is favorably at least approximately 50% by mass and is preferably 90% by mass to 99% by mass (for example, 95% by mass to 99% by mass). The proportion of the binder in the overall negative electrode mixture layer can be, thr example, approximately 1% by mass to 10% by mass and is generally favorably approximately 1% by mass to 5% by mass.

After the negative electrode mixture slurry has been dried, the thickness and density of the negative electrode mixture layer can be adjusted by the execution of a suitable pressing treatment (various heretofore known pressing methods can be used, for example, roll pressing methods, platen pressing methods, and so forth). The density of the negative electrode mixture layer can be, for example, approximately 0.5 g/cm$^3$ to 2.0 g/cm$^3$ (typically approximately 1.0 g/cm$^3$ to 1.5 g/cm$^3$). The void ratio in the negative electrode mixture layer can be, for example, approximately 5% by volume to 40% by volume (typically approximately 10% by volume to 35% by volume and preferably approximately 15% by volume to 30% by volume).

The lithium secondary battery can be fabricated by preparing an electrode assembly in which the previously described positive electrode and negative electrode are stacked and housing this electrode assembly in a suitable battery case along with an electrolyte that contains an overcharge inhibitor. A separator is interposed between the positive electrode and negative electrode in a typical structure for the herein disclosed lithium secondary battery.

<<The Separator>>

The various porous sheets as heretofore used in lithium secondary batteries can be used as the separator. Favorable examples are porous resin sheets (film, nonwoven fabric, and so forth) prepared from a resin such as polyethylene (PE), polypropylene (PP), polyester, cellulose, polyamide, and so forth. This porous resin sheet may have a monolayer structure or may have a multilayer structure of two or more layers (for example, a three-layer structure in which a PP layer is laminated on both sides of a PE layer (PP/PE/PP)). Preferred properties for the porous sheet (typically a porous resin sheet) can be exemplified by an average pore diameter of approximately 0.001 μm to 30 μm and a thickness of approximately 5 μm to 100 μm (more preferably approximately 10 μm to 30 μm), although there is no particular limitation to the preceding. The porosity (void ratio) of the porous sheet can be, for example, approximately 20% by volume to 90% by volume (preferably approximately 30% by volume to 80% by volume).

The separator may be a heat-resistant separator in which a porous heat-resistant layer is provided on one side or both sides (typically on one side) of a porous sheet as described above. This heat-resistant layer can be, for example, a layer that contains an inorganic filler and a binder. For example, an inorganic filler such as alumina, boehmite (alumina hydrate represented by the compositional formula $Al_2O_3 \cdot H_2O$), silica, titania, calcia, magnesia, zirconia, boron nitride, or aluminum nitride can preferably be used. In a lithium secondary battery that uses a solid electrolyte (lithium polymer battery), a construction may be used in which the electrolyte doubles as the separator.

In a herein disclosed preferred embodiment, the electrode assembly is a wound electrode assembly in which a long strip-Shaped positive electrode and a long strip-shaped negative electrode are stacked and wound. More preferably, the width, considered in the width direction of the long strip-shaped positive electrode, for the sum of the positive electrode mixture layer and the positive electrode assist layer is formed so as to exceed the width of the negative electrode mixture layer. The herein disclosed positive electrode assist layer, because it substantially does not contain a positive electrode active material, can be fabricated with a broad width without restriction by the width of the negative electrode mixture layer. Due to this, the reaction field for the overcharge inhibitor can be significantly increased and large amounts of gas can then be rapidly generated when overcharging occurs. A more rapid operation of the current-interrupt mechanism can be brought about as a consequence.

<<The Electrolyte>>

The electrolyte used here typically has a composition in which a supporting salt (i.e., a lithium salt) is incorporated in a suitable nonaqueous solvent. A suitable selection from the same supporting salts as used in ordinary lithium secondary batteries can be used as the supporting salt. The lithium salts used in lithium secondary batteries can be exemplified by $LiPF_6$, $LiBF_4$, $LiClO_4$, $LiAsF_6$, $Li(CF_3SO_2)_2N$, and $LiCF_3SO_3$. A single one of these supporting salts can be used or two or more can be used in combination. $LiPF_6$ is an example of a particularly preferred supporting salt. The electrolyte is preferably prepared so as to provide a supporting salt concentration within the range from 0.1 mol/L to 5 mol/L (preferably 0.8 mol/L to 1.5 mol/L). The electrolyte may also be a solid (gel) electrolyte provided by the addition of a polymer to this liquid electrolyte.

The various nonaqueous solvents used in typical lithium secondary batteries, for example, organic solvents such as carbonates, esters, ethers, nitriles, sulfones, and lactones, may be used without particular limitation as the nonaqueous solvent. Specific examples are ethylene carbonate (EC), propylene carbonate (PC), diethyl carbonate (DEC), dimethyl carbonate (DMC), ethyl methyl carbonate (EMC), vinylene carbonate, 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, and γ-butyrolactone. The carbonates here encompass both cyclic carbonates and chain carbonates. The ethers encompass both cyclic ethers and chain ethers. A single one of these nonaqueous solvents may be used by itself or a suitable combination of two or more may be used.

A nonaqueous solvent that is mainly carbonate is an example of a preferred embodiment. The use of such a nonaqueous solvent for the electrolyte is preferred because this enables the formation of a good quality film on the surface of the negative electrode active material in the cell charging process, infra. Favorable for use thereamong are EC, which has a high dielectric constant, and DMC and EMC, which have high oxidation potentials (wide potential windows). For example, the use is preferred of a nonaqueous solvent that contains a single carbonate or two or more carbonates as nonaqueous solvent wherein the total volume of these carbonates accounts for at least 60% by volume (more preferably at least 75% by volume and even more preferably at least 90% by volume, and may be substantially 100% by volume) of the volume of the overall nonaqueous solvent.

<<The Overcharge Inhibitor>>

An overcharge inhibitor is incorporated in the electrolyte in the herein disclosed battery. Any substance that has an oxidation (decomposition) potential greater than or equal to the charging upper limit potential for the positive electrode and that is capable of generating a gas by undergoing oxidative decomposition when this potential is exceeded and an overcharged state is reached, can be used without particular limitation as the overcharge inhibitor. Specific examples are biphenyl compounds, cycloalkylbenzene compounds, alkylbenzene compounds, organophosphorus compounds, aromatic compounds substituted by the fluorine atom, carbonate compounds, cyclic carbamate compounds, and alicyclic hydrocarbons. When the oxidation potential of the overcharge inhibitor resides in the vicinity of the charging upper limit potential for the positive electrode, there is then a risk that a gradual decomposition will occur—due, for example, to local increases in the potential—during normal charge-discharge. When, on the other hand, the oxidation potential is too much higher, there is then a risk that a sharp temperature rise will be produced by reactions between the electrolyte and the electrode material (typically the positive electrode active material) prior to gas generation by the oxidative decomposition of the overcharge inhibitor. Accordingly, for example, an overcharge inhibitor having an oxidation potential in the 4.4 V to 4.9 V range is preferably used with a lithium secondary battery in which the charging upper limit potential (vs. $Li/Li^+$) has been set to approximately 4.0 V to 4.2 V (this can be a lithium secondary battery which assumes a fully charged state at approximately 4.0 V to 4.2 V).

Compounds that exhibit this property can be exemplified by biphenyl (BP), alkylbiphenyl, terphenyl, 2-fluorobiphenyl, 3-fluorobiphenyl, 4-fluorobiphenyl, 4,4'-difluorobiphenyl, cyclohexylbenzene (CHB), trans-butylcyclohexylbenzene, cyclopentylbenzene, t-butylbenzene, t-aminobenzene, o-cyclohexylfluorobenzene, p-cyclohexylfluorobenzene, tris (t-butylphenyl)phosphate, phenyl fluoride, 4-fluorophenyl acetate, diphenyl carbonate, methyl phenyl carbonate, bistertiary-butylphenyl carbonate, diphenyl ether, and dibenzofuran. Particularly preferred for use among the preceding are biphenyl (BP), cyclohexylbenzene (CHB), and cyclohexylbenzene derivatives.

There are no particular limitations on the amount of use for the overcharge inhibitor, but, viewed from the perspective of ensuring an adequate amount of gas for the operation of the overcharge protection mechanism, and considered with reference to 100 parts by mass of the electrolyte, at least approximately 0.01 parts by mass (typically 0.1 parts by mass) is favorable and at least 0.5 parts by mass is preferred. However, since the overcharge inhibitor can function as a resistance component for the battery reactions, addition of the inhibitor may lower the input/output characteristics when an excess is added. Viewed from this perspective, the amount of the overcharge inhibitor is favorably held to not more than approximately 10 parts by mass (typically 5 parts by mass) and is preferably held to not more than 4 parts by mass (for example, not more than 3 parts by mass). For example, 0.1 parts by mass to 5 parts by mass (typically 0.5 parts by mass to 5 parts by mass) is favorable and 0.1 parts by mass to 4 parts by mass (particularly 0.5 parts by mass to 3 parts by mass) is preferred. Since in the herein disclosed battery a broad reaction field (i.e., the positive electrode assist layer) is secured for the overcharge inhibitor, the amount of use of the overcharge inhibitor can be reduced from the amount heretofore used. This makes it possible to realize an excellent battery performance (for example, a high battery capacity).

<<The Battery Case>>

The materials and configurations used in conventional lithium secondary batteries can be used for the battery case. The materials can be exemplified by relatively lightweight metals such as aluminum and steel and by resins such as polyphenylene sulfide resins and polyimide resins. Among the preceding, the use of a relatively lightweight metal (for example, aluminum or an aluminum alloy) is preferred for the purpose of improving heat dissipation and raising the energy density. The shape of this case (the container shape) can be, for example, circular (cylindrical, coin shape, button shape), hexahedral (rectangular parallelepiped, cube shape), bag shape, and shapes provided by processing and altering the preceding.

<<The Current-Interrupt Mechanism>>

The herein disclosed battery is provided with a current-interrupt mechanism that operates when the internal pressure in the battery case has undergone an increase. This current-interrupt mechanism should be able to interrupt the current in response to a rise in the internal pressure (i.e., the rise in internal pressure is a trigger for operation), but is not otherwise particularly limited, and the same mechanism as in any of the heretofore known current-interrupt mechanisms disposed in batteries of the type under consideration can be used as appropriate. For example, a structure as shown in FIG. 1 and described below is preferably used. This structure is configured in such a manner that a member that is a constituent of the conduction pathway from an electrode terminal to the electrode assembly undergoes deformation when the internal pressure in the battery case has risen, thereby interrupting the conduction pathway by separating from the other side.

Figure 2:
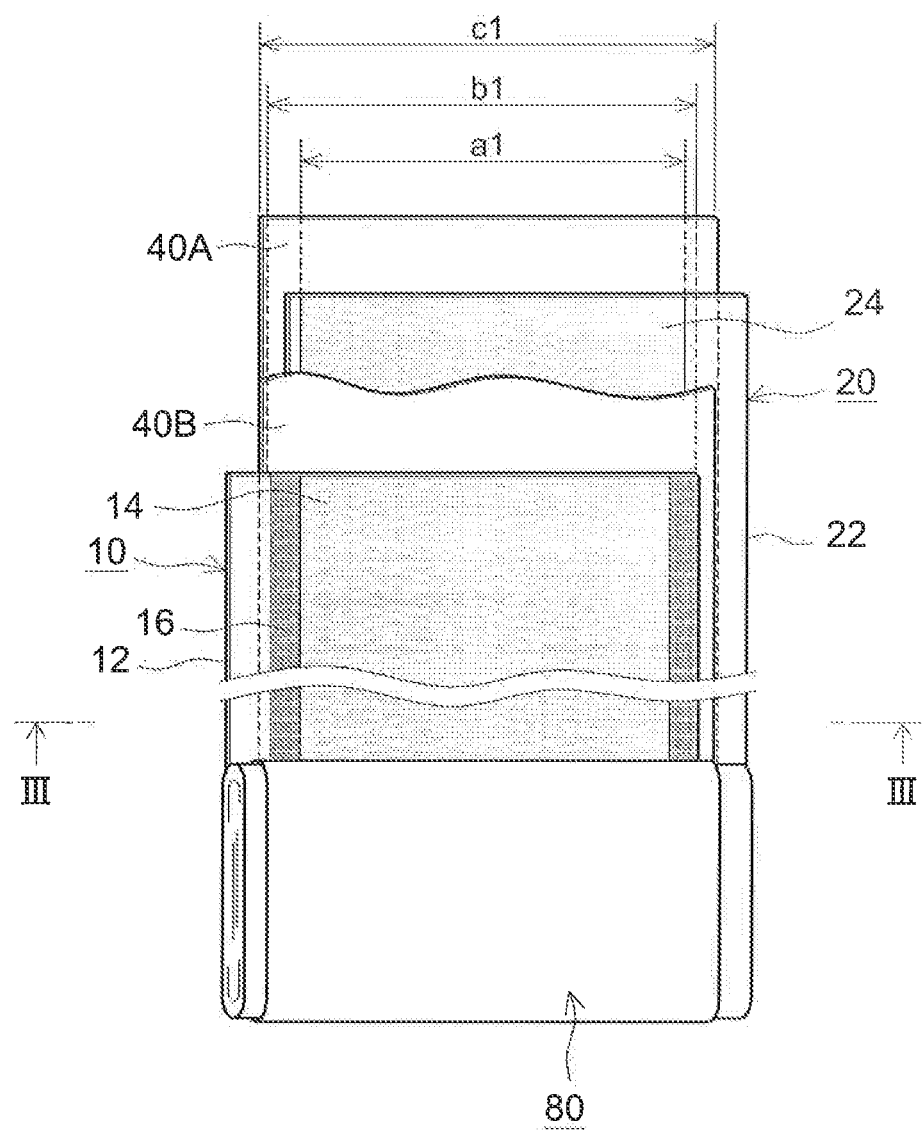
FIG. 2 is a schematic diagram that shows the structure of the wound electrode assembly in a hermetically sealed lithium secondary battery according to an embodiment of the present invention.
Figure 3:
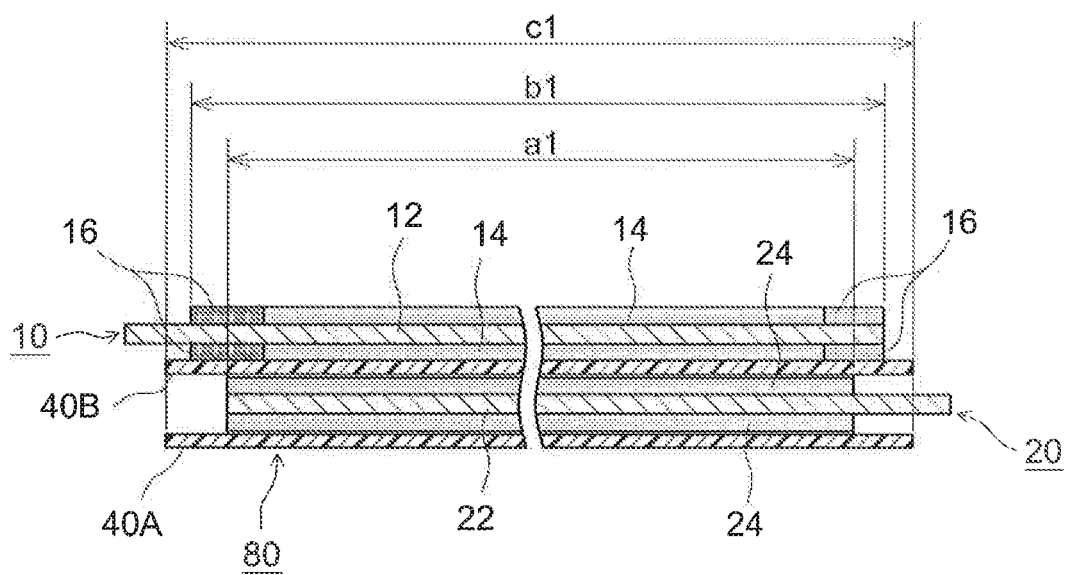
FIG. 3 is a schematic diagram that shows the cross section at the line III-III in FIG. 2.

While not intended as a particular limitation, a lithium secondary battery having a configuration in which a flat wound electrode assembly (wound electrode assembly), an electrolyte, and an overcharge inhibitor are housed in a flat box-shaped (rectangular parallelepiped) container, and for which the schematic structure is shown in FIGS. 1, 2, and 3, is used as an example of the schematic structure of a lithium secondary battery according to an embodiment of the present invention.

The cross-sectional structure of a lithium secondary battery 100 is shown schematically in FIG. 1. This lithium secondary battery 100 is provided with a wound electrode assembly 80 and a battery case 50. The wound electrode assembly 80 is shown schematically in FIG. 2. A cross section at the line III-III in FIG. 2 is shown in FIG. 3.

As shown in FIG. 1, the lithium secondary battery 100 according to this embodiment has a structure in which an electrode assembly (a wound electrode assembly) 80—itself having a structure in which a long strip-shaped positive electrode sheet 10 and a long strip-shaped negative electrode sheet 20 are wound flat with long strip-shaped separators 40A and 40B interposed therebetween—is housed along with an overcharge inhibitor-containing electrolyte (not shown) in a flat box-shaped (rectangular parallelepiped) battery case 50.

The battery case 50 is provided with a case main body 52 that is open at its upper end and that has a flat rectangular parallelepiped shape and is also provided with a lid 54 that closes this opening. A positive electrode terminal 70 that electrically connects to the positive electrode sheet 10 of the wound electrode assembly 80 and a negative electrode terminal 72 that electrically connects to the negative electrode sheet 20 of this electrode assembly 80 are disposed in the upper side (i.e., the lid 54) of the battery case 50.

A current-interrupt mechanism 30 that is operated by a rise in the internal pressure in the battery case is disposed in the interior of the battery case 50. The current-interrupt mechanism 30 is configured to be capable, when the internal pressure in the battery case 50 has undergone an increase, of interrupting the charging current by breaking the conduction pathway (for example, the charging pathway) from at least one of the electrode terminals to the electrode assembly 80.

In this embodiment, the current-interrupt mechanism 30 is disposed between the positive electrode terminal 70 fixed in the lid 54 and the electrode assembly 80 and is configured to break the conduction pathway from the positive electrode terminal 70 to the electrode assembly 80 when the internal pressure in the battery case 50 has undergone an increase.

This current-interrupt mechanism 30 can contain, for example, a conduction member. The conduction member is provided with a first member 32 and a second member 34 in this embodiment. In addition, the structure is such that, when the internal pressure in the battery case 50 rises, at least one of the first member 32 and the second member 34 (here, the first member 32) undergoes deformation and the conduction pathway is broken by a separation from the other member. In this embodiment, the first member 32 is a metal deformation plate and the second member 34 is a metal connection plate that joins to the metal deformation plate 32. The metal deformation plate (the first member) 32 has an arch shape in which the central region is curved downward, while at its edge region it is connected through a current collector lead terminal 35 to the bottom of the positive electrode terminal 70. In addition, the tip of a curved portion 33 of the metal deformation plate 32 is joined to the upper side of the metal connection plate 34. A positive electrode current collector plate 74 is joined to the lower surface (back side) of the metal connection plate 34, and this positive electrode current collector plate 74 is connected to the positive electrode sheet 10 of the electrode assembly 80. A conduction pathway is formed in this manner from the positive electrode terminal 70 to the electrode assembly 80.

The current-interrupt mechanism 30 is also provided with an insulating case 38 formed of, for example, a plastic. This insulating case 38 is disposed so as to enclose the metal deformation plate 32 and to thereby provide a gastight enclosure of the upper surface of the metal deformation plate 32. The inner pressure of the battery case 50 does not act on this gastight-enclosed upper surface of the curved portion 33. The insulating case 38 also has an opening that is traversed by the curved portion 33 of the metal deformation plate 32, and the lower surface of the curved portion 33 is exposed from this opening to the interior of the battery case 50. The interior pressure in the battery case 50 acts on this lower surface of the curved portion 33 that is exposed to the interior of the battery case 50.

In the thusly structured current-interrupt mechanism 30, when the internal pressure in the battery case 50 rises, this internal pressure acts on the lower surface of the curved portion 33 of the metal deformation plate 32 and the curved portion 33, which is curved downward, is pressed upward. This upward pressing on the curved portion 33 increases as the internal pressure in the battery case 50 rises, in addition, when the internal pressure in the battery case 50 exceeds a set pressure, the curved portion 33 is deflected vertically backward and is deformed so as to bend upward. A connection point 36 between the metal deformation plate 32 and the metal connection plate 34 is broken by this deformation of the curved portion 33. The conduction pathway from the positive electrode terminal 70 to the electrode assembly 80 is broken as a result and the overcharging current is then shut off.

This embodiment uses an example in which the conduction member that deforms upon a rise in the internal pressure is structured divided into the first member 32 and the second member 34, but there is no limitation to this. For example, the conduction member may be a single member. In addition, the current-interrupt mechanism 30 is not limited to the positive electrode terminal 70 side and may be disposed on the negative electrode terminal 72 side. Moreover, the current-interrupt mechanism 30 is not limited to a mechanical interruption associated with the deformation of the metal deformation plate 32 as described above, and, for example, the internal pressure in the battery case 50 can be detected by a sensor and the current-interrupt mechanism can take the form of an external circuit that will interrupt the charging current when the internal pressure detected by this sensor exceeds a set pressure.

The wound electrode assembly 80 according to the present embodiment is characterized by the formation of a positive electrode assist layer 16 on a positive electrode current collector 12, but, excluding this feature, is the same as the wound electrode assembly in an ordinary lithium secondary battery. That is, in the stage prior to the assembly of the wound electrode assembly 80, the structure of the wound electrode assembly 80 has a long strip-shaped (ribbon-shaped) sheet structure (sheet-shaped electrode assembly) as shown in FIGS. 2 and 3. The wound electrode assembly 80 can be fabricated by preparing a positive electrode sheet 10 by forming a positive electrode mixture layer 14 along the longitudinal direction on one side or both sides (both sides here) of a long strip-shaped positive electrode current collector 12 and forming a positive electrode assist layer 16 containing an electroconductive material and a binder to a side of the positive electrode mixture layer; preparing a negative electrode sheet 20 by forming a negative electrode mixture layer 24 along the longitudinal direction on one side or both sides (both sides here) of a long strip-shaped negative electrode current collector 22; stacking the positive electrode sheet 10 and the negative electrode sheet 20 together with two long strip-shaped separator sheets 40A and 40B; winding in the longitudinal direction; and pressing the wound electrode assembly flat from the side direction.

In addition, a positive electrode current collector plate 74 (FIG. 1) is attached to the end, considered in the winding direction, of the positive electrode sheet 10 and a negative electrode current collector plate 76 (FIG. 1) is attached to the end, considered in the winding direction, of the negative electrode sheet 20, and these are electrically connected, respectively, to the positive electrode terminal 70 and the negative electrode terminal 72.

FIG. 3 schematically shows an enlarged view of a part of the III-III cross section along the winding axis for the wound electrode assembly 80 in FIG. 2. Since in this structure a positive electrode active material is substantially not present in the positive electrode assist layer 16, no problem appears even when the width, considered in the width direction of the wound electrode assembly, for the sum of the positive electrode mixture layer 14 and the positive electrode assist layer 16 exceeds the width of the negative electrode mixture layer 24. Thus, a wide positive electrode assist layer 16 can be formed and, because the reaction field for the overcharge inhibitor is then extended, a large amount of gas can be rapidly generated when overcharging occurs. In the example shown in FIGS. 2 and 3, the width b1 for the sum of the positive electrode mixture layer 14 and the positive electrode assist layer 16 is somewhat wider than the width a1 of the negative electrode mixture layer 24 (b1>a1). In addition, the width c1 of the separator 40A and 40B is somewhat wider than b1, and thus c1>b1>a1.

In the specific Working Example provided below, a hermetically sealed lithium secondary battery (here, a lithium ion battery) provided with this electrode assembly was fabricated and the performance of the positive electrode assist layer was evaluated. However, there is no intent to limit the present invention to that which is shown in this specific example.

<Working Example>

A slurry-form composition for forming the positive electrode mixture layer (the positive electrode mixture slurry) was prepared by mixing $LiNi_{1/3}Co_{1/3}Mn_{1/3}O_2$ powder as positive electrode active material powder, acetylene black as electroconductive material, and polyvinylidene fluoride (PVdF) as binder, at a mass ratio among these materials of 91:6:3, with N-methylpyrrolidone (NMP) so as to provide a solids concentration (NV) of approximately 50% by mass. A positive electrode mixture layer was formed by coating this positive electrode mixture slurry in a width of 50 mm along the longitudinal direction on one side of a long strip-shaped aluminum foil (the positive electrode current collector) having a thickness of approximately 15 μm.

A slurry-form composition for forming the positive electrode assist layer (the positive electrode assist slurry) was then prepared by mixing acetylene black (AB) as electroconductive material and polyvinylidene fluoride (PVdF), at a mass ratio between these materials of 90:10, with N-methylpyrrolidone (NMP) so as to provide a solids concentration (NV) of approximately 50% by mass. A positive electrode assist layer was formed by coating this positive electrode assist slurry along the longitudinal direction in a width of 4 mm on each side of the positive electrode mixture layer that had already been produced on the positive electrode current collector. The resulting positive electrode was dried and pressed and cut perpendicular to the longitudinal direction at a length of 30 mm to produce a sheet-shaped positive electrode (positive electrode sheet).

A water-based slurry-form composition for forming the negative electrode mixture layer (the negative electrode mixture layer slurry) was prepared by mixing natural graphite (powder) as the negative electrode active material, styrene-butadiene rubber (SBR), and carboxymethyl cellulose (CMC), at a mass ratio among these materials of 98:1:1, with deionized water so as to provide an NV of 45% by mass. A negative electrode mixture layer was formed by coating this negative electrode mixture layer slurry in a width of 54 mm along the longitudinal direction on one side of a long strip-shaped copper foil (the negative electrode current collector) having a thickness of approximately 10 μm. The resulting negative electrode was dried and pressed and cut perpendicular to the longitudinal direction at a length of 30 mm to produce a sheet-shaped negative electrode (negative electrode sheet).

An electrode assembly was fabricated by disposing the thusly fabricated positive electrode sheet (dimensions (mm) approximately 70×30) and negative electrode sheet (dimensions (mm) approximately 70×30) face-to-face with a separator (a porous polyethylene sheet (PE) was used here) therebetween. A laminate sheet-type lithium secondary battery was fabricated by housing this electrode assembly along with an overcharge inhibitor-containing electrolyte (the electrolyte used here was prepared by dissolving $LiPF_6$ as the electrolyte at a concentration of approximately 1 mol/L in a mixed solvent that contained ethylene carbonate (EC), dimethyl carbonate (DMC), and ethyl methyl carbonate (EMC) in a volumetric ratio of 3:4:3 and additionally incorporating cyclohexylbenzene (CHB) as the overcharge inhibitor at a concentration of approximately 2 parts by mass per 100 parts by mass of the electrolyte) in a laminate sheet.

COMPARATIVE EXAMPLE

In this example, a positive electrode sheet was made by forming a positive electrode mixture layer on a positive electrode current collector using the same composition and method as in the Working Example, but without the application of the positive electrode assist layer applied thereafter in the Working Example. That is, a laminate sheet-type lithium secondary battery was fabricated as in the Working Example, but omitting the formation of the positive electrode assist layer on the positive electrode sheet.

<Measurement of the Amount of Gas Generation within the Battery Cell>

The lithium secondary batteries fabricated in the Working Example and Comparative Example were submitted to a suitable conditioning treatment (for example, an initial charge discharge treatment in which the following were carried out 2 to 3 times in repetition: a process of constant-current charging for 3 hours at a charging rate of $1/10$ C followed by charging at constant current and constant voltage to 4.1 V at a charging rate of $1/3$ C, and a process of constant-current discharge to 3.0 V at a discharge rate of $1/3$ C) followed by measurement of the cell volume by the Archimedean method. The Archimedean method is a method in which the measurement target (the laminate-type lithium secondary battery in these examples) is immersed in a liquid medium (for example, distilled water or an alcohol) and the volume of the measurement target is determined by measuring the buoyancy acting on the measurement target.

After this, the lithium second batteries according to the Working Example and Comparative Example were charged at constant current at 1 C (1 C is the current value that enables full charge-discharge in 1 hour) to an overcharged state (5.2 V in these examples) followed by re-measurement of the cell volume by the Archimedean method. The gas yield (mL) for overcharging was calculated by subtracting the cell volume after the conditioning treatment from the cell volume after overcharging. The results are given in FIG. 4.

Figure 4:
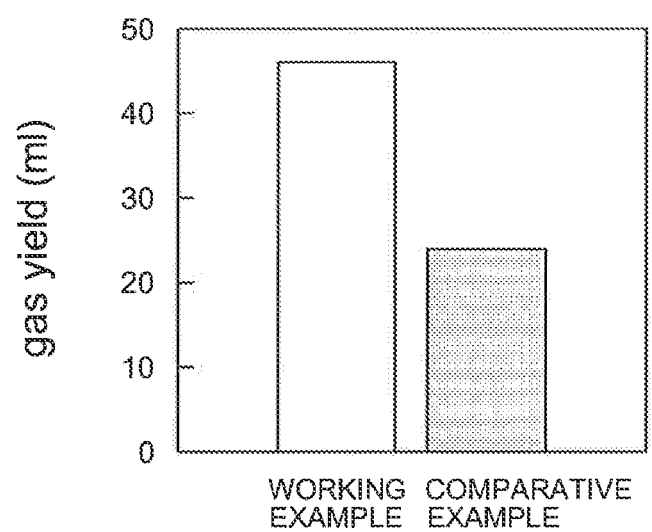
FIG. 4 is a graph that shows the amount of gas generation in an example of the present invention and in a comparative example.

As shown in FIG. 4, about twice as much gas (48 mL) was generated in the Working Example, which had a positive electrode assist layer, than in the Comparative Example, which lacked the positive electrode assist layer. This result is thought to be caused by a favorable decomposition of the overcharge inhibitor not just at the surface of the positive electrode mixture layer but also at the surface of the positive electrode assist layer. The herein disclosed lithium secondary battery is thus able to increase the amount of gas generation when overcharging occurs, without changing the amount of addition of the overcharge inhibitor and/or without changing the compositional proportions in the positive electrode mixture layer. It could therefore be confirmed that, through a technique different from conventional techniques, the operating performance of the current-interrupt mechanism could be improved and the tolerance of lithium secondary batteries at the time of overcharging could be raised.

Specific examples of the present invention are described in detail in the preceding, but these are nothing more than examples and impose no limitations on the claims. Various modifications and alterations to the specific examples provided above as examples are encompassed by the art described in the claims.

INDUSTRIAL APPLICABILITY

Figure 5:
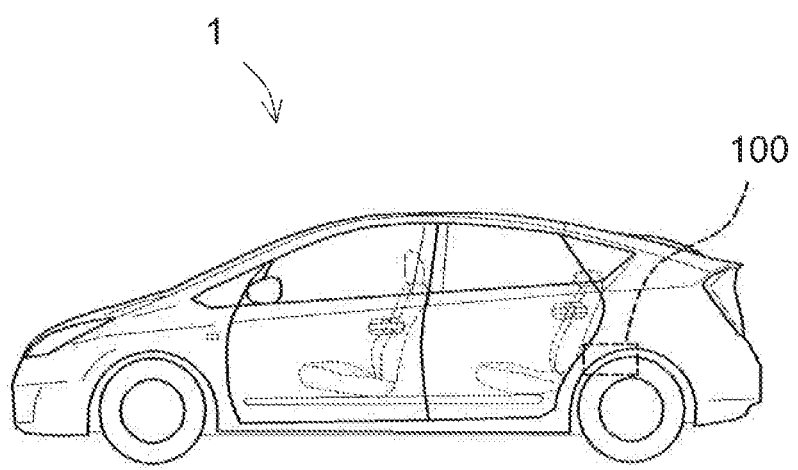
FIG. 5 is a side view that schematically illustrates a vehicle (an automobile) in which a hermetically sealed lithium secondary battery according to an embodiment of the present invention is mounted.

The hermetically sealed lithium secondary battery according to the present invention is characterized by an excellent battery performance (for example, a high battery capacity and a high-current output are possible) and as described above by an excellent tolerance (reliability) at the time of overcharging. Accordingly, utilizing these properties, it can be favorably used in particular as a motive power source (drive power source) for a motor installed in a vehicle, e.g., an automobile. That is, as shown in FIG. 5, the present invention provides a vehicle 1 (typically an automobile and in particular a hybrid automobile, plug-in hybrid automobile, electric automobile, and so forth) that is equipped with any of the herein disclosed hermetically sealed lithium secondary batteries (including a battery pack configuration in which a plurality of batteries are connected) 100.

REFERENCE SIGNS LIST 1 automobile (vehicle)
10 positive electrode sheet (positive electrode)
12 positive electrode current collector
14 positive electrode mixture layer
16 positive electrode assist layer
20 negative electrode sheet (negative electrode)
22 negative electrode current collector
24 negative electrode mixture layer
30 current-interrupt mechanism
32 metal deformation plate (first member)
34 metal connection plate (second member)
38 insulating case
40A, 40B separator sheet (separator)
50 battery case
52 case main body
54 lid
70 positive electrode terminal
72 negative electrode terminal
74 positive electrode current collector plate
76 negative electrode current collector plate
80 wound electrode assembly
100 hermetically sealed lithium secondary battery

The invention claimed is:

1. A hermetically sealed lithium secondary battery comprising
an electrode assembly that has a positive electrode and a negative electrode,
a battery case that houses the electrode assembly and an electrolyte, and
a current-interrupt mechanism that operates when the internal pressure of the battery case has risen, wherein
the positive electrode comprising a positive electrode current collector and a positive electrode mixture layer formed on the positive electrode current collector and including a positive electrode active material, an electroconductive material, and a binder;
the negative electrode comprising a negative electrode current collector and a negative electrode mixture layer formed on the negative electrode current collector and including a negative electrode active material and a binder;
a positive electrode assist layer that includes an electroconductive material and a binder and that substantially does not contain a positive electrode active material is formed on the positive electrode current collector in at least a portion of an area adjacent to the positive electrode mixture layer;
the positive electrode mixture layer is not formed on the area; and
the electrolyte contains an overcharge inhibitor that generates a gas when a prescribed battery voltage is exceeded.

2. The hermetically sealed lithium secondary battery according to claim 1, wherein the electrode assembly is a wound electrode assembly in which
a sheet-shaped positive electrode having, on a sheet-shaped positive electrode current collector, a positive electrode mixture layer of prescribed width formed along the longitudinal direction of the current collector and
a sheet-shaped negative electrode having, on a sheet-shaped negative electrode current collector, a negative electrode mixture layer that has a width greater than that of the positive electrode mixture layer and that is formed along the longitudinal direction of the current collector are stacked and wound, and wherein
the positive electrode assist layer is formed at the sheet-shaped positive electrode along the longitudinal direction at on least one side along the longitudinal direction of the positive electrode mixture layer.

3. The hermetically sealed lithium secondary battery according to claim 2, wherein in the width direction of the sheet-shaped positive electrode, the width in the sum of the positive electrode mixture layer and the positive electrode assist layer is formed so as to exceed the width of the negative electrode mixture layer.

4. The hermetically sealed lithium secondary battery according to claim 1, wherein the density of the positive electrode mixture layer is at least 2.0 g/cm$^3$.

5. The hermetically sealed lithium secondary battery according to claim 1, wherein the specific surface area of the electroconductive material incorporated in the positive electrode assist layer is at least 100 m$^2$/g.

6. The hermetically sealed lithium secondary battery according to claim 1, wherein at least one aromatic compound is incorporated as the overcharge inhibitor.

7. A vehicle provided with a hermetically sealed lithium secondary battery according to claim 1.

* * * * *